United States Patent [19]

Cross

[11] 4,232,780
[45] Nov. 11, 1980

[54] CONFECTION CONVEYOR
[75] Inventor: Stephen D. Cross, Fremont, Calif.
[73] Assignee: FMC Corporation, San Jose, Calif.
[21] Appl. No.: 45,041
[22] Filed: Jun. 4, 1979
[51] Int. Cl.³ .............................................. B65G 47/86
[52] U.S. Cl. ................................... 198/479; 198/653; 198/695
[58] Field of Search ........ 198/479, 377, 653, 694–696, 198/486; 414/71, 120; 226/173; 403/92; 294/97, 106, DIG. 2

[56] References Cited
U.S. PATENT DOCUMENTS
3,985,223  10/1976  Forcella et al. ................ 198/377 X Primary Examiner—Robert B. Reeves
Assistant Examiner—Douglas D. Watts
Attorney, Agent, or Firm—R. S. Kelly; T. J. McNaughton

[57] ABSTRACT

An improved carriage for use in a conveyor for transferring frozen confections includes a pair of scissorable tong-receiving arms. A pair of tongs are detachably mounted on the arms in a manner which facilitates rapid replacement of the tongs. Each tong is pivotable on a pin extending transversely of the arms and is held by a spring clip that remains attached to the arm during removal and replacement of the tong. Preferably, the clip is generally U-shaped and attached to the arm such that the inner wall thereof abuts against the inner surface of the tong. Such inner wall has an inwardly bent tip which snaps into place against the tong when the tong has been pivoted into alignment with the arm.

7 Claims, 9 Drawing Figures

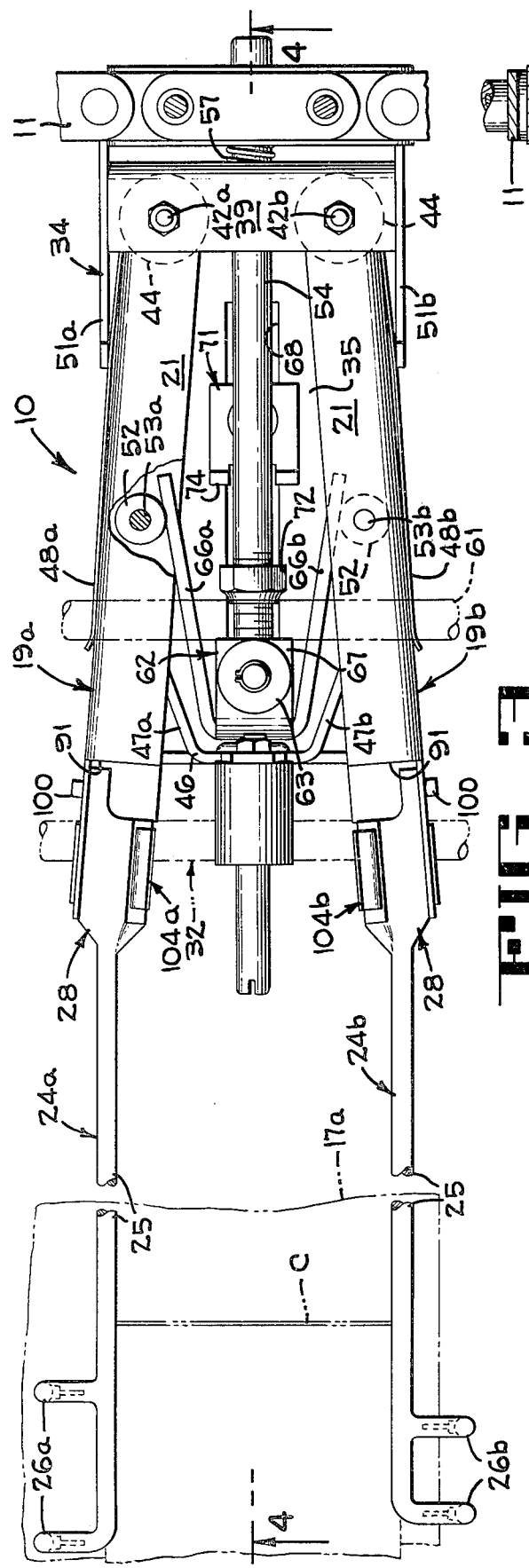
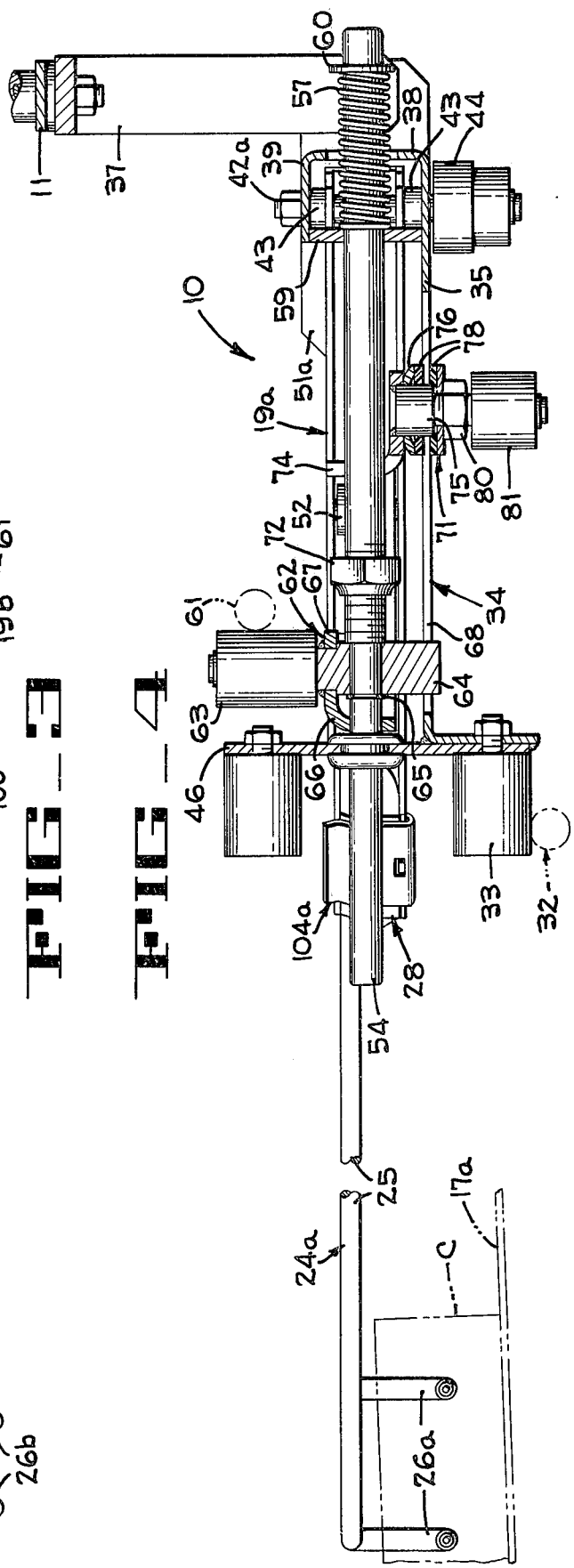
FIG-3
FIG-4

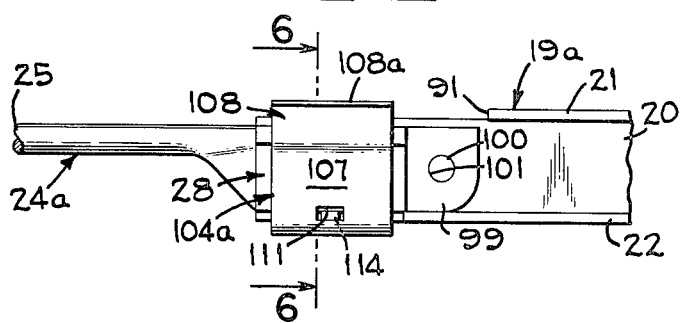
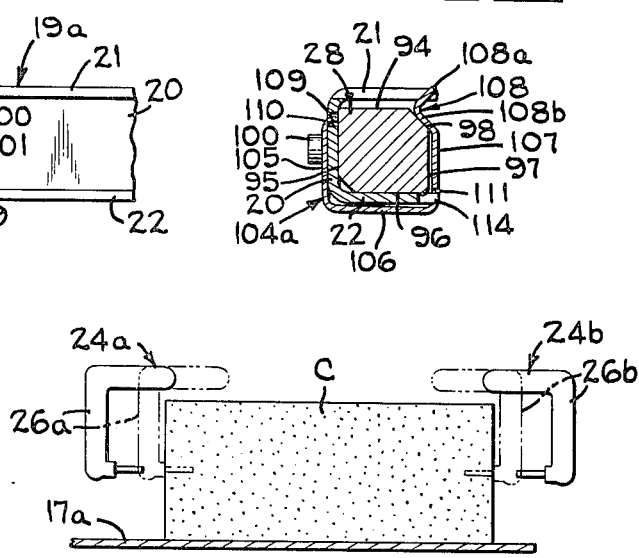
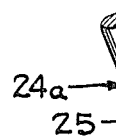
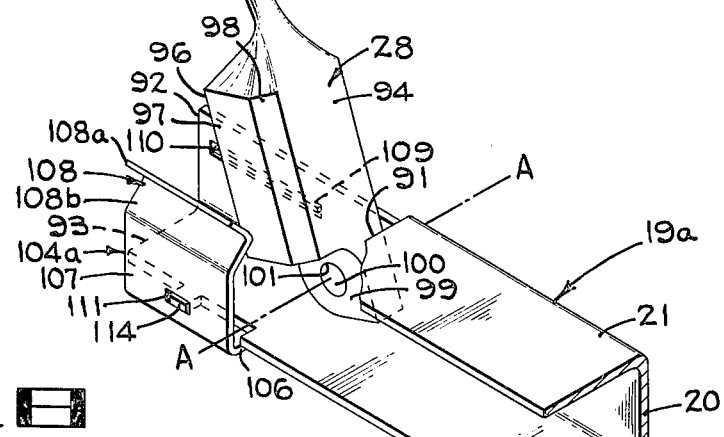
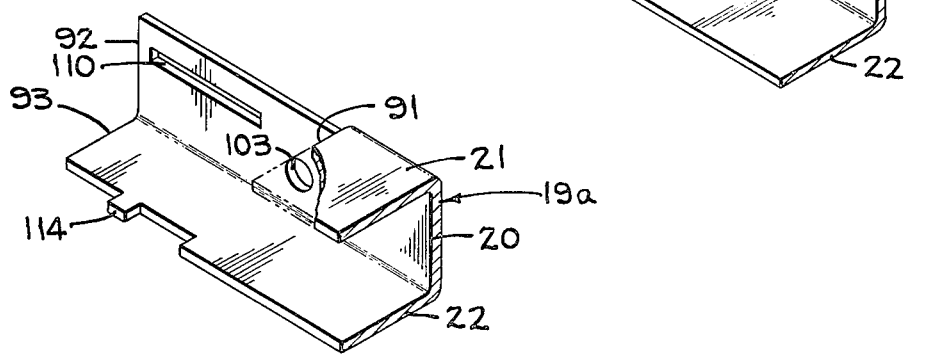

CONFECTION CONVEYOR

BACKGROUND OF THE INVENTION

1. Field of the Invention

The present invention pertains to an apparatus for producing frozen confections without the use of molds, and more particularly concerns an improved transfer conveyor for use in such apparatus.

2. Description of the Prior Art

In U.S. Pat. No. 3,985,223 issued to Peter W. Forcella et al on Oct. 12, 1976, a conveyor for transferring frozen confections is described as including a large number of articulated confection gripper mechanisms, hereinafter referred to as pickup carriages. The pickup carriages are interconnected to form an endless chain, and such endless chain of carriages is driven in timed relation to the freezer conveyor of the confection producing system. A pair of gripping tongs are detachably mounted to each carriage. The tongs are made in several configurations adapted to the different types of frozen confections to be produced, such as, for example, cones, stickless bar confections, and stick-type bar confections. More particularly, the tongs have either prongs at their outer ends adapted to cooperate to seize a stickless bar confection therebetween, or they have yolk type abutments at their outer ends for grasping cones, or they have interdigitating teeth for handling stick type confections. As shown in the Drawings in the Forcella et al patent, the prior art tongs which are adapted to handle stickless novelty bars of ice cream or the like have staple-like wire configurations which terminate in tips of reduced diameter adapted to penetrate into the sides of the bar confection.

As disclosed in the aforementioned Forcella et al patent, flanged mounting members are affixed to the inner ends of the gripping tongs, and two dowel pins are attached to the flange of each mounting member. The ends of the arms of the carriages to which the tongs are detachably mounted have two apertures formed therein for receiving the dowel pins that are affixed to the tongs. One of the two pins extends upwardly of each tong flange, and a spring clip is pivotally secured on such projecting pin. The spring clip has a C-shape which enables it to be rotated on the projecting pin to a position where it clamps the tong and the arm together and retains the tong on the arm. The spring clips of the opposed tong members are of opposite geometrical configurations, that is to say, they are not interchangeable from side to side on each carriage.

The primary shortcoming of the confection pickup conveyor shown in the Forcella et al patent is that it is relatively time consuming and difficult to replace the tongs of each carriage to enable the pickup conveyor to handle a different type of confection, such as, for example, to remove the tongs adapted to handle stick-type bar confections and then reinstall tongs adapted to handle stickless bar confections. More particularly, it has been found that the removable spring clips used to engage the tongs on the tong receiving arms of the carriages must be relatively stiff in order to rigidly fasten the tongs to the arms, and such stiffness makes it necessary for one to use a screwdriver to pry off such spring clips. Furthermore, since the spring clips are of opposite geometrical configurations, it is necessary that such clips be stored separately, because otherwise one might have some difficulty in finding the appropriate spring clip for the appropriate side of the carriage. Such problem in changing from one type of tong to another is particularly serious because a frozen confection transfer conveyor may have from 100 to 150 carriages, each of which has a pair of tongs which must be removed and replaced with a new pair of tongs.

SUMMARY OF THE INVENTION

The present invention provides an improved transfer conveyor for an apparatus for producing frozen confections without the use of molds wherein the confection carrying tongs of the carriages of the transfer conveyor are quickly replaceable without the necessity of removing and reinstalling spring clips or other parts. The improved transfer conveyor includes a large plurality of carriages, and each carriage includes a pair of arms which are mounted in opposed relationship and are scissorable between open and closed positions. Tongs are detachably mounted to the outer ends of the arms, and the tongs have prongs, or other confection engaging means, at their outer ends adapted to engage and hold a confection when the arms are in their closed positions.

According to the present invention, the outer end portions of the arms to which the tongs are fastened have spring clips provided thereat. Each clip includes a resilient wall which extends uprightly at the end of the arm and an opposed rigid wall spaced therefrom to define a channel therebetween. An inwardly projecting portion is formed at the upper end of the resilient wall. Each tong has an end portion that has a configuration to be snapped into place in the channel against the resilient spring clip wall and held in place therein by the projecting portion of the upper end of the resilient wall. The tong and arm are also pivotally connected by a pin which enables the tong to pivot about an axis normal to the upright resilient wall of the clip.

The fixed spring clip and pivotal mounting arrangement enable the tongs to be quickly replaced by simply upwardly pivoting them relative to the arms and shifting the tong inwardly to disengage the pivot pin connection. A new pair of tongs may then be quickly attached by sliding each tong into place on its pivot pin connection and downwardly pivoting it against the spring clip until the clip snaps into place around the inner end of the tong.

It will be appreciated that the improved transfer conveyor of the present invention can be converted to handle different types of confections in a much shorter period of time than the prior art transfer conveyors, because it is not necessary to remove any other parts or to use any tools in the process of switching the confection handling tongs.

BRIEF DESCRIPTION OF THE DRAWINGS

FIG. 3 is an enlarged top plan of a confection carrying carriage of the improved transfer conveyor, with the frozen confection (of the stickless slab type) and the plate of the freezer conveyor upon which the confection is supported being shown in phantom outline.

FIG. 4 is a section taken on line 4—4 of FIG. 3, again with the confection and support plate therefor being shown in phantom outline.

FIG. 5 is an enlarged fragmentary view in side elevation that illustrates the mounting arrangement between a confection carrying tong and the associated arm of the carriage.

FIG. 6 is a section taken on line 6—6 of FIG. 5.

FIG. 7 is a fragmentary isometric view further illustrating the pivotal mounting arrangement between a tong and a carriage arm.

FIG. 8 is a fragmentary isometric view, similar to FIG. 7, but which illustrates only the outer end portion of one of the tong-receiving carriage arms.

FIG. 9 is an end elevational view showing the outer ends of the tongs of a carriage in an open position registering with the sides of a confection to be subsequently picked up by such carriage and showing, in phantom outline, the closed position of the tongs where a confection is subsequently grasped by the tongs.

DESCRIPTION OF THE PREFERRED EMBODIMENT

Figure 1:
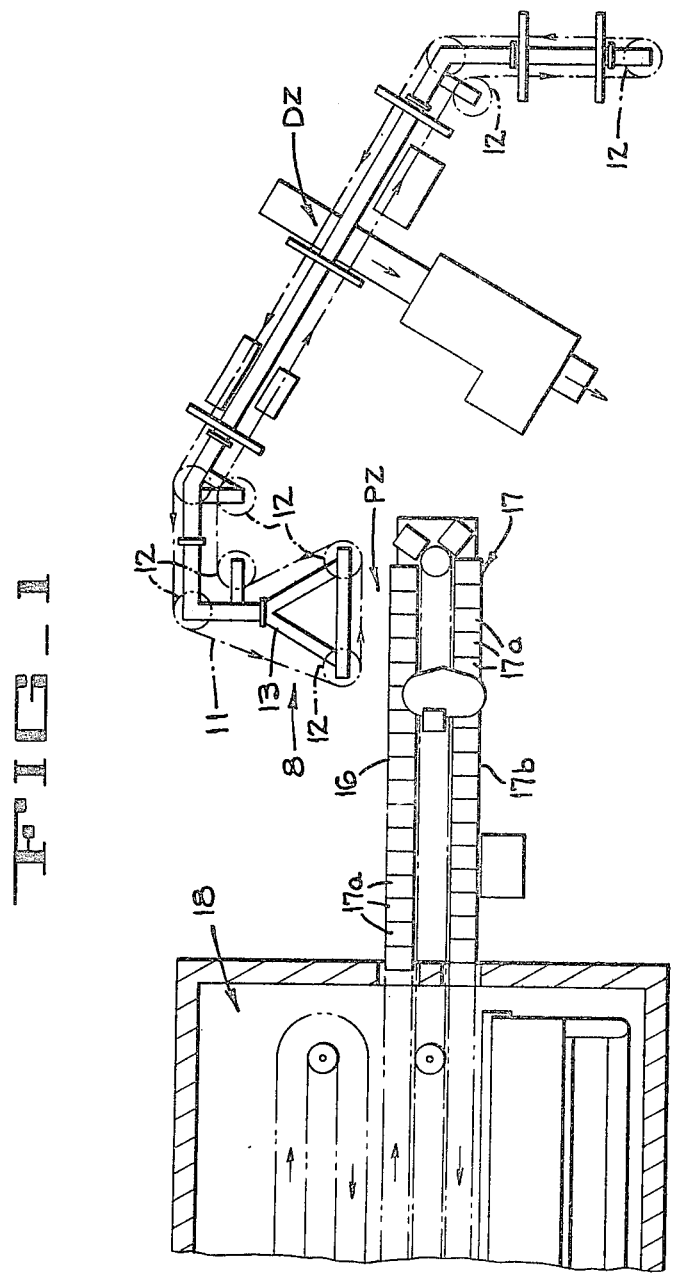
FIG. 1 is a diagrammatic top plan view of an apparatus for producing frozen confections that includes the improved confection transfer conveyor of the present invention.
Figure 2:
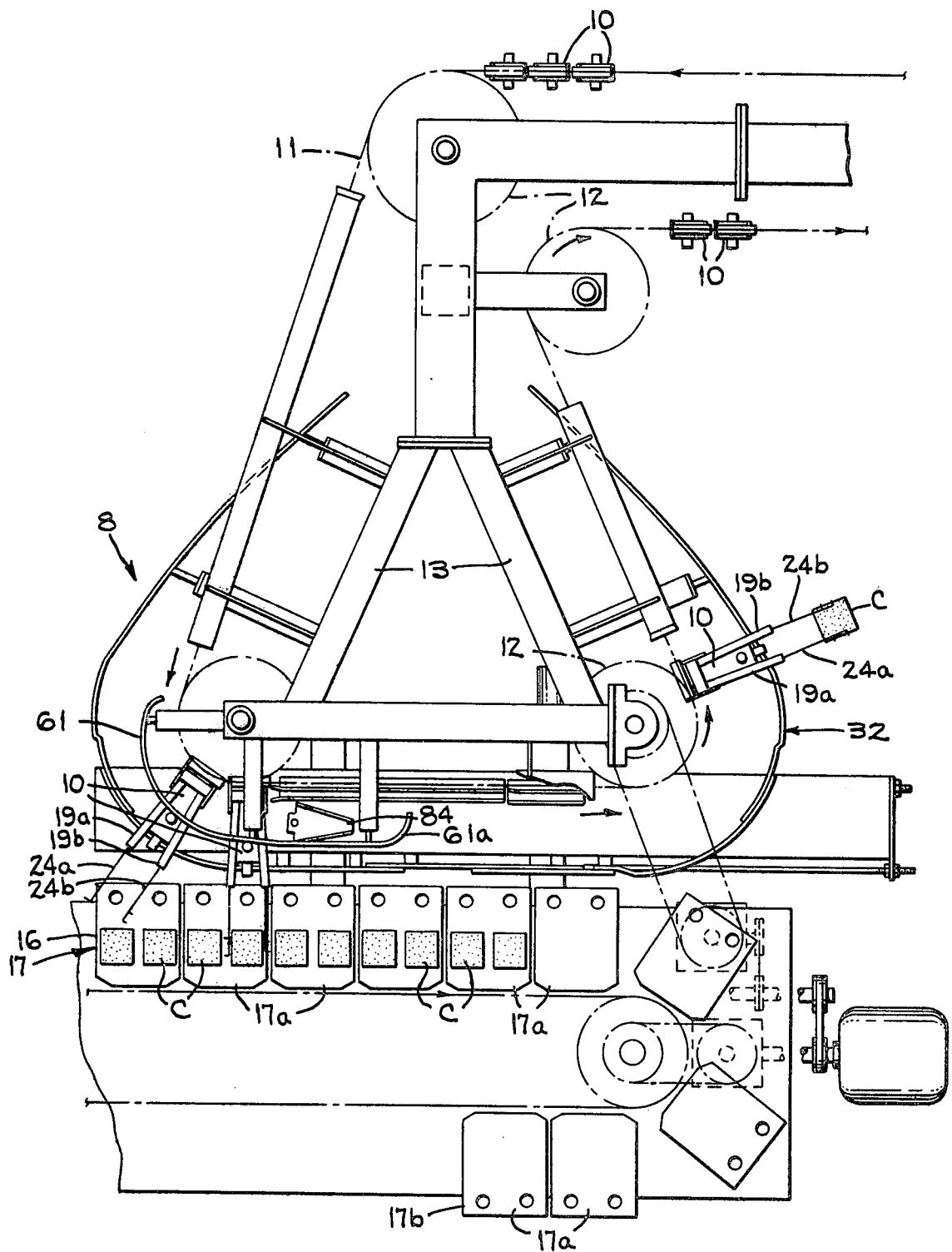
FIG. 2 is a somewhat diagrammatic top plan view of the pickup portion of the improved transfer conveyor with only two of the confection carrying carriages being diagrammatically illustrated.

Referring now more particularly to FIGS. 1 and 2, a system for producing frozen confections C will be seen to include a transfer conveyor 8 which is adapted to pick up the confections C at a pickup zone PZ from a freezer conveyor 17 and to release the confections at a drop zone DZ. The transfer conveyor 8 includes a large number of carriages 10, (such as, for example, over 140 carriages) that are mounted in uniform closely spaced relationship upon an endless chain 11. The chain 11 is entrained on several sprockets 12 that are mounted to a modular main frame 13 of the transfer conveyor. The transfer conveyor and its operation are fully shown and described in a copending United States patent application filed by myself and others on even date herewith and entitled Transfer Conveyor For Frozen Confections, identified by now pending U. S. Patent application Ser. No. 045,040. Such application is assigned to the assignee of the present application, and the disclosure thereof is incorporated by reference herein.

As disclosed in the aforementioned copending patent application and shown herein in FIG. 1, the endless transfer conveyor chain 11 is mounted for movement on a path adjacent to the outlet reach 16 of the freezer conveyor 17, the pickup zone PZ being located near the end of the outlet reach. The freezer conveyor 17 is comprised of a closely spaced series of plates 17a mounted to an endless chain which runs in spiralled fashion through a freezing vault 18. Semi-frozen confections C (FIG. 2) are formed on the inlet reach 17b of the freezer conveyor and such confections are frozen within the vault.

Each carriage 10 (FIG. 2) of the transfer conveyor 8 includes a pair of scissorable tong-receiving arms 19a and 19b, and tongs 24a and 24b are detachably mounted to the arms 19a and 19b, respectively. Each tong (FIGS. 3 and 4) includes a rod portion 25, and opposing prongs 26a and 26b are formed at the outer ends of the rod portions. The prongs 26a, 26b are shown in FIGS. 3, 4 and 9 and are of the conventional staple or U-shape that is suitable for picking up the stickless type of frozen bar confections. Such prongs include reduced-diameter tips adapted to pierce the sides of the confection when the tongs are closed upon the confection, as shown in FIG. 9. A mounting block 28 is formed at the inner end of the rod portion 25 of each arm. It will be seen that the tongs and arms are of opposite (mirror image) configurations that are symmetrical about a vertical plane through the centerline of the carriage.

Each carriage 10 includes a carriage frame 34 which is pivotally mounted at its rear end to a bracket 37 that, in turn, is rigidly attached to the endless chain 11 of the transfer conveyor. Such carriage frame 34 includes a flat bottom plate 35 and an upright wall 38 (FIG. 4) at the rear end of the bottom plate that is bent forwardly at its upper end to form a top flange 39. Referring to FIGS. 3, 4 and 7, it will be seen that the tong-receiving arms 19a and 19b are also of opposite geometrical configurations each being in the form of a channel which has a U-shape in cross-section. Each arm will be seen (FIG. 7) as including an outer wall 20, an upper wall 21 and a lower wall 22. The arms 19a and 19b are pivotally mounted at their rear ends to the carriage frame on pins 42a and 42b, respectively, that extend through the bottom plate 35 and top flange 39 of the carriage frame. Spacer washers 43 are positioned on each pin above and below the arm, and a stepped brace roller 44 is mounted on the lower end of each pin (FIG. 4). The front ends of the tong-receiving arms 19a and 19b are respectively guided by fingers 47a and 47b that project rearwardly of the carriage at a diverging angle and are received between the walls 21 and 22 of the arms. The fingers 47a and 47b are integrally formed with an upright member 46 welded at the front end of the bottom plate 35 of the carriage frame. The arms 19a and 19b are biased inwardly by leaf springs 48a and 48b, respectively, that are positioned between the outer walls 20 of the arms and upstanding side walls 51a and 51b formed at the rear end of the carriage. The guide fingers 47a and 47b have a width which is only slightly less than the distance between the upper and lower walls 21 and 22 of the arms so that the fingers guide and support the outer ends of the arms. Thus, when the tongs grasp and lift a confection, the fingers brace the arms, which, as will be seen in FIG. 4, are cantilevered from the pins 42a, 42b.

The tong-receiving arms 19a and 19b, and thus the tongs 24a and 24b, are operated by a wedge assembly 62 that is mounted on a push rod 54 which, in turn, is reciprocatably mounted to the carriage frame 34. The tong-receiving arms each have a roller 52 mounted on a pin 53a, 53b (FIG. 3) located near the center of each arm and extending between the upper and lower walls 21, 22 thereof. The wedge assembly 62 includes wedge arms 66a and 66b which bear against the rollers 52. As the push rod 54 is forced forwardly relative to the carriage frame, the wedge arms 66a and 66b force the rollers 52 outwardly to thereby open the arms into the spread position shown in FIG. 3. The push rod is biased rearwardly by a coil spring 57 (FIG. 4) mounted at the rear end of the push rod between an upright plate 59 and a retainer clip 60. The leaf springs 48a, 48b independently bias the arms inwardly so that the rollers 52 thereof remain engaged against the wedge assembly arms 66a, 66b. As described fully in the aforementioned copending patent application of Cross et al, a pneumatic cylinder (not illustrated herein) is used at the drop zone DZ of the transfer conveyor to strike the rear end of the push rod and thereby quickly open the arms to release the confection C engaged thereby.

As shown in FIG. 2, transfer conveyor 8 further includes a support rod assembly 32 which has a generally triangular shape in top plan. Each carriage 10 has a support roller 33 (FIG. 4) extending forwardly and longitudinally from the front end of the carriage frame 34, and such support roller rides on the support rod assembly 32. The rod assembly is contoured in elevation so as to upwardly and downwardly tilt the carriages as they move around the pickup portion of the transfer conveyor which is adjacent the freezer conveyor 17. As illustrated in FIG. 2, a cam rod 61 is also mounted to the frame 13 of the transfer conveyor inwardly of and above the support rod assembly 32. The cam rod 61 operates a roller 63 (FIGS. 3 and 4) which is attached to and extends upwardly from the wedge assembly 62. The cam rod 61 is shaped to bear against the roller 63 so as to extend the wedge assembly (i.e., move it forwardly on the carriage frame) and thus open the arms 19a and 19b (and thus the tongs 24a and 24b) to the opened position shown in FIGS. 3 and 9. The cam rod 61 is shaped to fully open the tongs prior to the time that the associated carriage arrives at the point in the pickup zone PZ where a confection C is to be picked up from the freezer conveyor 17. The cam rod 61 retains the roller 63 in its forward position (shown in FIGS. 3 and 4) until the carriage is lowered by the support rod assembly 32 such that the ends of the tongs register with the sides of a confection.

More specifically, the wedge assembly 62 includes a block 64 having a pin portion formed at its upper end upon which the roller 63 is rotatably mounted. The block 64 is received on the push rod 54 between a shoulder formed on the rod and a retainer clip 65. The wedge arms 66a, 66b are integrally formed with a fabricated member that has a front wall 66 having an aperture therein through which the push rod 54 extends. Such fabricated member further includes a tab 67 which extends rearwardly and has an aperture therein for receiving the pin portion of the wedge assembly upon which the roller 63 is mounted.

With continued movement of a carriage 10 on the support rod assembly 32 across the pickup zone PZ, it is brought to the point in the pickup zone where the tongs 24a, 24b are closed on the sides of the confection C, such closed position of the tongs being shown in phantom outline in FIG. 9. The cam rod 61 is inwardly curved at its downstream end 61a (FIG. 2) to gradually permit the wedge-operating roller 63 to move rearwardly under the biasing pressure of the coil spring 57. To control the tong spacing of the closed position of the tongs, each carriage includes an adjustable friction stop assembly 71 that is slidable in the slot 68 in the bottom plate 35 of the carriage frame and is adapted to engage a lock nut 72 mounted on the push rod 54 to set the spacing of the tongs in their closed position. The stop assembly 71 includes a stop bracket 74 mounted on a pin 75 which is adapted to move in the slot 68. The pin is adjustably secured to the bottom plate by tightening a nut 80 which is secured on a threaded portion of the pin. A concave metal washer 76 is disposed above the bottom plate 35 against the bracket 74, and flat plastic washers 78 are disposed immediately above and below the bottom plate, with the nut 80 serving to tighten such assemblage together. A roller 81 is mounted on the portion of the pin 75 below the nut 80. The roller 81, as disclosed in the aforementioned copending application of Cross et al, cooperates with a fixed deflector 84 (FIG. 2) to reposition the stop assembly. By changing the position of deflector 84 on the conveyor frame structure, all of the friction stop assemblies 71 of all of the various carriages are reset in sequence as the carriages move past the deflector 84. In setting closing position of the tongs 24a, 24b, it is desired that the tips of the prongs 26a, 26b penetrate the confection only to a selected depth (FIG. 9).

The important aspect of the present invention relates to the mounting of the tongs 24a, 24b to the arms 19a, 19b which enables the tongs to be rapidly removed and replaced. Referring to FIGS. 3 and 8, it will be seen that the outer edge 91 of the upper wall 21 of each arm is recessed relative to the outer edge 92 of the outer wall 20 and the outer edge 93 of the lower wall 22. Thus, the outer end portions of the arms 19a, 19b have diametrically opposite L-shaped configurations which are symmetrical about a plane through the centerline of the carriage.

The mounting block 28 (FIG. 7) of each of the tongs 24a, 24b has a rectangular shape including an upper surface 94, a flat outer surface 95 (FIG. 6), a flat lower surface 96, and a flat inner surface 97. The edge between the upper surface 94 and the inner surface 97 is chamfered, or beveled, to form a beveled surface 98. A projection 99 is formed at the end of the mounting block adjacent the outer surface 95 thereof. A pin 100 (FIG. 7) is force-fitted within a bore 101 extending transversely through the mounting block at the center of the projection 99. As shown in FIG. 6, the pin extends outwardly from the block. An aperture 103 (FIG. 8) is formed in the outer wall 20 of each arm at a position which is forward of the outer edge 91 of the upper wall 21. The pin 100 is rotatably received in such aperture when the tong is connected to its associated arm thereby permitting the tong to be pivoted about an axis A—A extending through the pin, as shown in FIG. 7.

The tongs 24a, 24b are locked in place on their respective arms 19a, 19b by spring clips 104a and 104b which are fixedly attached to the arms 19a and 19b and remain attached thereto during the process of removing a tong and replacing it with a different type of tong. Each spring clip is of identical form, and, as seen in FIGS. 5–7, includes an outer wall 105, a lower wall 106, and an inner wall 107. Such walls form a U-shape which opens upwardly when attached to the respective tong-receiving arm and with the carriage in its horizontal orientation as seen in FIG. 4. The upper end of the inner wall 107 is bent inwardly into a V-shaped abutment 108 adapted to snap in place against the beveled surface 98 of the tong block 28 when the tong is downwardly pivoted against the lower wall 22 of the arm. Such V-shaped abutment 108 includes an upwardly and inwardly extending upper portion 108a which enables the tongs to be pivoted downwardly on their pivot axis A—A against such upwardly extending portion to thereby open the spring clip. With further pivoting, the spring clip snaps into place with the lower abutment portion 108b thereof bearing against the beveled surface 98 of the mounting block.

A simple construction for fixedly mounting the spring clips 104a, 104b to the tong-receiving arms 19a, 19b is illustrated in FIGS. 6–8. The upper end of the outer wall 105 of each spring clip is bent inwardly to form a hooked upper edge 109. A slot 110 is longitudinally formed in the outer end portion of the outer wall 20 of each arm to permit the hooked upper edge 109 of the spring clip to be engaged therein. The spring clip has a short slot 111 (FIG. 7) formed in its opposing inner wall 107 adjacent the bottom thereof, and such slot 111 is adapted to receive a tab 114 formed in the inner edge of the lower wall 22 of the arm. Such tab 114 is formed between portions of the inner edge of the wall 22 which have been cut away. The spring clips are each fixedly attached to the respective arm by engaging the hooked portion 109 of the outer wall of the clip in the slot 110 and pivoting the spring clip inwardly until the tab 114 is engaged in the slot 111 of the clip.

Having thus described the improved transfer conveyor 8 of the present invention, a brief description of the method of changing the tongs 24a and 24b of the carriages will now be described. As previously indicated herein and as is well known in the art, the tongs will be understood to have various prong configurations adapted to handle specific types of confections. In the operation of the improved transfer conveyor of the present invention, when it is desired to switch from one type of tong to another type of tong, it is only necessary to grasp the tong by its rod portion 25 and upwardly pivot the tong on its pivot axis A—A until the tong is released from the spring clip 104a or 104b and is oriented in a position perpendicular to the lower wall 22 of the associated arm 19a or 19b. Then, the tong (with its pin 100 attached) may be pulled outwardly from the aperture 103 in the arm, thereby completely removing the tong from the arm without the necessity of disengaging the spring clip or any other part from the arm.

The fitting of a new tong 24a, 24b on the arm 19a, 19b is equally simple. The new tong is grasped by its rod portion 25 and is held in an orientation which is generally perpendicular to the lower wall 22 of the arm to which it is to be connected. Then the tong is moved between the edge of the inner wall 107 of the spring clip 104a, 104b and the front edge 91 of the upper wall 21 of the arm so as to insert the pin 100 in the aperture 103 of the arm. Next, the tong is pivoted downwardly against the adjacent spring clip. The upper abutment portion 108a of the clip first engages the mounting block of the tong with the sloped contour thereof facilitating the opening of the spring clip. The tong is further pivoted until the spring clip snaps into place with the abutment portion 108b being tightly engaged against the beveled surface 98 of the mounting block 28. In this position, the tong is held firmly in place by the spring clip. During the process of pivoting the tong into place, the substantial length of the pin 100 (FIG. 6) assures that the pin will not become disengaged from the aperture 103.

Although the best mode contemplated for carrying out the present invention has been herein shown and described, it will be apparent that modification and variation may be made without departing from what is regarded to be the subject matter of the invention.

What is claimed is:

1. An improved conveyor for conveying frozen confections of the type including endless conveyor means, a plurality of carriages mounted in series on said endless conveyor means, each of said carriages including a pair of tong-receiving arms pivotally mounted for scissor type of movement, and a tong mounted to the outer end of each of said pair of arms, said tongs including means at their outer ends for grasping the frozen confection to be conveyed, wherein the improvement comprises means for detachably mounting each of the tongs to an associated arm of the carriage, said mounting means comprising spring clip means provided at the outer end of the arm, said spring clip means including a resilient upstanding wall terminating in an inwardly projecting upper end portion and a second upstanding wall opposed to and spaced from said resilient upstanding wall, and pin means for pivotally and detachably connecting said tong to said arm for rotation about an axis which is transverse of said arm and inwardly of said spring clip means, said tong having a shape to be received between the upstanding walls of said spring clip means with said inwardly projecting portion of said resilient wall normally maintaining said tong in alignment with said arm but permitting said tong to be pivoted in one direction on said pin means to disengage the tong from said spring clip means, said tong being pivotable in the opposite direction on said pin means and permit said tong to be snapped into place within said spring clip means.

2. The improved conveyor according to claim 1 wherein said outer end of each arm to which a respective tong is detachably mounted has an L-shaped cross-section that includes a transverse wall portion and an outer wall portion extending perpendicularly from the outer edge of said transversely extending wall portion, and wherein said spring clip means includes a spring clip having a U-shaped cross-section including an outer wall, a lower wall and an inner wall, said spring clip being mounted on said outer end of the associated arm such that said inner wall comprises said resilient upstanding wall of said spring clip means and said outer wall portion of the arm and outer wall of the spring clip comprise the second upstanding wall of said spring clip means.

3. The improved conveyor according to claim 2 wherein said outer wall of said spring clip is bent at its upper end to form a hooked edge portion and said inner wall of said spring clip includes a slot formed longitudinally therein, said outer wall portion of said arm having a slot formed longitudinally therein, and a tab is formed on the edge of said transverse wall portion of said arm, said spring clip being mounted to said outer end portion of the arm with said hooked edge portion engaged in said longitudinally extending slot in the arm and with said tab extending into said slot formed in the spring clip.

4. The improved conveyor according to claim 1 wherein said arms of said carriages are each formed from a member having a U-shaped cross-section including inwardly extending upper and lower walls and an outer wall extending between said upper and lower walls, said carriages each including a carriage frame, and means for pivotally mounting the rear ends of said arms to said carriage frame, the outer end portions of said arms comprising an L-shaped projection formed by cutting away an outer end portion of the upper wall thereof, said spring clip means including a spring clip connected to said L-shaped projection and including an upstanding wall that comprises said resilient upstanding wall, said pin means for pivotally connecting a tong to an arm being disposed between said recessed edge of said upper wall and said spring clip.

5. The improved conveyor according to claim 4 wherein each carriage further includes means for supporting the front ends of said arms as they are scissored on said carriage frame, said supporting means including a member mounted at the front end of said carriage frame which includes a pair of guide arms which extend at a diverging angle toward the rear of said carriage frame, said guide arms being received between said upper and lower walls of said arms.

6. The improved apparatus according to claim 4 wherein said spring clip has a U-shaped in cross-section including said resilient upstanding wall, a lower wall, and an outer wall which is opposite said upstanding wall; said outer wall of said clip being attached to the outer wall of the arm and forming said second upstanding wall therewith.

7. An improved carriage for a transfer conveyor adapted to transfer products, such as frozen confections, from a first area to a second area, said carriage including a carriage frame, a pair of tong-receiving arms, a tong mounted to the end of each arm, each arm being pivotally connected at its rear end to said carriage frame so that the arms are mounted in opposed relationship to pivot in a plane in a scissor-like manner, and means for detachably mounting the tongs to the outer ends of said arms including a spring clip fixed to the projecting end of each arm, each spring clip including a resilient wall extending in parallel spaced relationship to a fixed wall at the projecting end of the associated arm, and means associated with each arm and tong for pivotally interconnecting the tong and arm to permit the tong to rotate about an axis which is normal to said resilient wall fixed wall and parallel to the plane of motion of the arms and to be received therebetween, said resilient wall flexing to permit said tong to be snapped into alignment with said arm.

* * * * *